United States Patent
Carrasco Vergara et al.

(10) Patent No.: US 9,810,593 B2
(45) Date of Patent: Nov. 7, 2017

(54) PEDALING TORQUE AND POWER MEASURING DEVICE FOR A BICYCLE

(71) Applicants: Rotor Componentes Tecnologicos S.L., Madrid (ES); Indra Sistemas, S.A., Madrid (ES)

(72) Inventors: Pablo Carrasco Vergara, Madrid (ES); David Martinez Garcia, Madrid (ES); Octavio Campos Barroso, Madrid (ES); Jose Anton Herraiz, Madrid (ES)

(73) Assignees: Rotor Componentes Tecnologicos S.L., Madrid (ES); Indra Sistemas, S.A., Madrid (ES)

( * ) Notice: Subject to any disclaimer, the term of this patent is extended or adjusted under 35 U.S.C. 154(b) by 0 days.

(21) Appl. No.: 14/996,266

(22) Filed: Jan. 15, 2016

(65) Prior Publication Data

US 2016/0209281 A1    Jul. 21, 2016

(30) Foreign Application Priority Data

Jan. 19, 2015 (ES) .................................. 201530055

(51) Int. Cl.
| | |
|---|---|
| *G01L 3/00* | (2006.01) |
| *G01L 3/10* | (2006.01) |
| *B62M 3/00* | (2006.01) |
| *G01L 3/24* | (2006.01) |
| *B62J 99/00* | (2009.01) |
| *G01B 7/30* | (2006.01) |

(52) U.S. Cl.
CPC ............... *G01L 3/108* (2013.01); *B62J 99/00* (2013.01); *B62M 3/00* (2013.01); *B62M 3/003* (2013.01); *G01B 7/30* (2013.01); *G01L 3/242* (2013.01); *B62J 2099/002* (2013.01)

(58) Field of Classification Search
CPC ........................................................ G01L 3/108
See application file for complete search history.

(56) References Cited

U.S. PATENT DOCUMENTS

| 6,886,416 B2 * | 5/2005 | Tsay ........................ B62M 6/45 73/862.321 |
| 7,861,599 B2 * | 1/2011 | Meggiolan .............. G01L 3/108 73/760 |
| 8,117,923 B2 * | 2/2012 | Sasaki .................... B62K 19/34 73/862.49 |

(Continued)

*Primary Examiner* — Lisa Caputo
*Assistant Examiner* — Tran M Tran
(74) *Attorney, Agent, or Firm* — Power Del Valle LLP; Marguerite Del Valle (57) ABSTRACT

A torque and power measuring device corresponding to the non-drive side cyclist leg, comprising a hollow shaft connecting the two bicycle crank arms with strain sensors arranged in the shaft surface. These sensors are connected to an electronic control unit housed inside the shaft, to which are also connected other different sensors to measure a plurality of interesting quantities (pedaling cadence, crank arm angular position . . . ). This electronic control unit picks the sensor signals up, stores them and performs pre-programmed software operations to later wirelessly output the result signals towards a receiving device for analysis and/or storage them, by means of an antenna located outside the shaft and anchored to the outer surface of the jointed crank arm with the shaft.

15 Claims, 8 Drawing Sheets

(56) References Cited

U.S. PATENT DOCUMENTS

| | | | |
|---|---|---|---|
| 8,485,050 B2* | 7/2013 | Yao | B62M 6/50 |
| | | | 73/862.08 |
| 8,689,645 B2* | 4/2014 | Watarai | B62M 3/00 |
| | | | 73/862.381 |
| 8,746,081 B2* | 6/2014 | Sasaki | B62M 3/003 |
| | | | 73/862.045 |
| 8,800,389 B2* | 8/2014 | Tetsuka | B62M 3/00 |
| | | | 73/862 |
| 8,825,279 B2* | 9/2014 | Kitamura | G01L 25/006 |
| | | | 701/33.1 |
| 8,833,182 B2* | 9/2014 | Tetsuka | B62M 3/003 |
| | | | 73/862.621 |
| 8,881,608 B2* | 11/2014 | Tetsuka | B62M 3/16 |
| | | | 73/862 |
| 9,097,598 B2* | 8/2015 | Grassi | G01L 3/108 |
| 9,322,725 B2* | 4/2016 | Tetsuka | G01L 3/247 |
| 9,434,446 B2* | 9/2016 | Kawakami | B62M 6/50 |
| 9,459,167 B2* | 10/2016 | Heinkel | B62M 3/08 |
| 9,463,358 B2* | 10/2016 | Watarai | A63B 24/0062 |
| 9,496,769 B2* | 11/2016 | Tetsuka | B62M 3/003 |
| 2008/0236293 A1 | 10/2008 | Meggiolan | |
| 2013/0019700 A1 | 1/2013 | Matsumoto | |
| 2013/0024137 A1 | 1/2013 | Grassi | |
| 2014/0074348 A1 | 3/2014 | Kitamura et al. | |
| 2014/0182393 A1 | 7/2014 | Heinkel et al. | |

* cited by examiner

PEDALING TORQUE AND POWER MEASURING DEVICE FOR A BICYCLE

The present invention relates to measure and analyse devices for the applied torque and power when pedalling on a bicycle, thus allowing the quality improvement on training and sporting performance.

PRIOR ART

Currently there are numerous systems based on the use of sensors placed in different locations for measuring relevant physical magnitudes, in order to obtain the pedalling power. To do this, we must know the torque and angular velocity at some point in the transmission way between the pedals and the contact area of the wheel with the ground. These magnitudes are usually component's deformations or deformations between components, to determine the torque value and the position for determining the speed value. Many of the applied systems in cycling measure the elastic deformation with strain gauges.

It is generally considered angular crank speed as a constant value for each revolution, thus approximating the value of the measured cadence with the angular crank speed, to estimate the power output in each pedalling cycle. This rough calculation involve a measurement error because the crank angular speed not constant depending on pedalling conditions, but that error is generally negligible in the case of round chainrings.

Many Prior Art existing power meters estimate angular velocity by observing the applied torque versus time and the maximum torque value in each shaft revolution. In this model estimation one revolution corresponds to the time between two consecutives torque maximums, thus estimating the angular velocity as a constant in each cycle. This method involves as well, errors in the pedaling cadence measurement due to the type of ground, torque peaks, etc., which require a difficult signal filter process to minimise them.

In relation to the calculation of the torque, there are existing systems that measure the deformation of the components affected by the joint action of both legs, such as the spider, the chain and the rear wheel hub.

Moreover, there are systems which measure the deformation of a component affected only by the action of one leg of the cyclist, such as pedals, cranks and bottom bracket. So, in the case of cranks or pedals, it can be measured either only one leg or both legs separately. In the case of measuring the crank shaft deformation, the torque data obtained is only and exclusively the corresponding to the leg on the opposite chainrings side, that is to say the left leg.

The most usual component to measure the pedalling torque is the spider arranging the chainrings. However, in this arrangement it is measured the total torque applied by both cyclist legs and it is lost important information about the biomechanics of pedaling, because it is also required to know other parameters: the working way of each leg separately; if the cyclist leg works during the rising pedal or not; if the leg applied force is intermittent or nearly uniform, and the angular range corresponding to maximum power generated.

In the Prior Art there are numerous documents disclosing different ways of measuring the pedaling torque and/or power exerted by a cyclist.

In some cases, as in patent ES1101230, there are disclosed systems that obtain the applied torque in each crank, measuring the crank flexion in the pedaling plane by placing sensors on the crank arms.

In other cases, as in document EP0386005 SRM, the strain gauges are placed on the right crank-spider assembly, thus requiring the use of a special manufactured crank-spider set arranging the measuring sensors.

SRAM-Quarq document WO2008058164 discloses a system that functions much in the same way as the aforementioned SRM, because it requires the use of a special manufactured right spider including the strain gauge. This system also describes the use of an accelerometer to measure the cadence and hypothetically the position and the crank angular speed.

Ambrosina document U.S. Pat. No. 6,418,797 uses strain gauges arranged in the rear wheel hub of the bicycle to measure the applied torque on the rear hub and then calculate the corresponding power, in a known way. This system requires the use of a special manufactured rear wheel. A commercial product with this technology is available by Saris Cycling Group marketed under the designation Powertap.

Gerlitzki document U.S. Pat. No. 6,356,847, which describes the product marketed as Ergomo, uses optical sensors on the bottom bracket to measure only the left leg power, assuming that right leg power is exactly the same. This system requires the use of a special manufactured shaft-bearing assembly connecting the crank arms.

Polar document U.S. Pat. No. 6,356,848 uses sensors to monitor the chain tension for controlling its speed and vibration. The mounting of this system requires to measure the length and weight of the chain, it is difficult to install and calibrate and is less reliable than other systems mentioned.

Several methods have been developed to relate the applied force to a pedal with the crank angular position, such as that disclosed in Brim Brothers EP2300796A1 wherein a force sensor embedded in the cyclist cleat measures the exerted power.

In the present application it is measured the torque exerted by the cyclist on the crank axle to subsequently calculate several parameters of interest. The closed Prior Art documents are the following: Campagnolo US20080236293, disclosing a torque meter arranged in a two-pieces crank axle, in which joint area are located the strain gages in order to measure the shaft deformation; US20130024137 Grassi, describing as well a hollow crank axle provided with strain gauges mounted on a carrier inside the axle in order to measure the torsion torque; Foundation Fitness US2014165744, showing a hollow crank axle with strain gauges inside measuring the axle torque. None of these systems has reached the market implemented in a real product. Besides, although they refer to the wireless signal transmission of the data from the electronic control unit located inside the shaft to the outside thereof, for being received by an electronic receiver located anywhere on the bike, none of them describes how to solve the problem of the shielding effect produced by the spindle itself, either by the absorption, reflection, interference or redirection of the radiofrequency signal.

Consequently, there is a strong need to provide a device which solves the problem of (RF) the radiofrequency signals transmission from inside the spindle towards the outside thereof, considering that bicycle components in general and specifically shafts are made of metallic materials that do not allow to pass through the RF signal.

SUMMARY OF THE INVENTION

An object of the present invention is a measuring device of the torque and power exerted by a cyclist with his left leg corresponding to the nondrive bicycle side, comprising a hollow crank axle connecting the two crank arms and provided with deformation or strain sensors placed either on the spindle outside surface or on the spindle inside surface, in order to measure its torsional deformation and directly calculate the torque applied by the cyclist left leg. Each bicycle crank has a different assembly configuration with said spindle: one crank is non-detachable with said shaft and therefore working as a single element, and the other crank arm is removable by the user. The aforementioned sensors, as well as a plurality of different type of sensors to measure other quantities of our interest, are connected to an electronic control unit housed in a support member located inside said spindle.

This electronic control unit is responsible for collecting and storing the input signals and data from the abovementioned sensors, carrying arithmetic operations previously programed and giving output signals and data of the relevant pedaling parameters we choose (cadence, crank angular position, . . . ) and afterwards sending them out wirelessly by a radio frequency emitting device or antenna to a signal receiving device located on a CPU unit or cycle computer for further analysis or data storage. Said emitting device is located outside the shaft anchored to the outer surface of the non-detachable crank arm, and said receiving device is usually located on the handlebars or bike frame.

PREFERRED EMBODIMENT

In a preferred embodiment of the present invention it is proposed a torque and power sensor device (9) to measure the exerted torque by the non-drive side cyclist leg, comprising: a hollow shaft (1) configured in one piece, which connects the two bicycle crank arms, being one of them the jointed crank arm (40, 40') relative to the shaft (1), and the other one the detachable crank arm (41, 41'); at least one strain sensor (10) disposed on the outer or inner surface of said shaft (1) which measures the deformation caused by the torque on the shaft (1); at least one angular position sensor (20) or rotation sensor of the shaft (1); a support member (2) housed inside the shaft (1) and moving jointly with it, which supports an electronic control unit (3) configured to receive input signals at least from the abovementioned strain (10) and positioning (20) sensors, to store data, to perform pre-programmed calculate operations with them and to output result signals; a power supply unit (5) housed inside the support member (2); a radiofrequency antenna (81) wiring (80) connected to the electronic control unit (3), which wirelessly sends said result signals out. This radiofrequency antenna (81) is located outside the shaft (1)

anchored to the outer surface of the jointed crank arm (40, 40') in its corresponding assembly area with the shaft (1).

Figure 9:
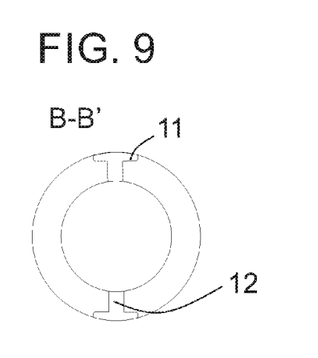
FIG. 9 is the B-B' section of the shaft (1) of FIG. 7 showing the recesses (11a, 11b) for locating the strain sensors (10) as well as the openings (12) for the passage of its electrical wiring (8).

The longitudinal axis (X) of said hollow shaft (1) is its rotational axis and therefore is the rotational axis of all elements housed on the shaft (1). In a preferred embodiment, said strain sensor (10) is arranged on the outer surface of the shaft (1) which comprises at least one opening (12) to let the strain sensor (10) wiring pass by to connect it with the electronic control unit (3). Also, the shaft (1) is provided with at least one recess (11) made on its outer surface wherein at least one strain sensor (10) is housed. In a preferred embodiment, said recess (11) is discontinuously configured in at least two recesses (11a, 11b) made diametrically opposed on the shaft (1) outer surface, where the abovementioned strain sensors (10) are symmetrically arranged. Once the strain sensors (10) are housed in these recesses, they are covered with a protective material film to avoid impacts and humidity, and thus ensure the assembly fixation and sealing. Furthermore, the diameter defining the depth of said recesses (11a, 11b), that is to say the sensors (10) housing diameter, is smaller than the inner diameter of the bottom bracket bearings (50).

In addition, the shaft (1) has a thickening in the section of its inner surface, to compensate the shaft section in the area corresponding to the mentioned recess (11) in order to maintain its mechanical properties.

Figures 4, 5:
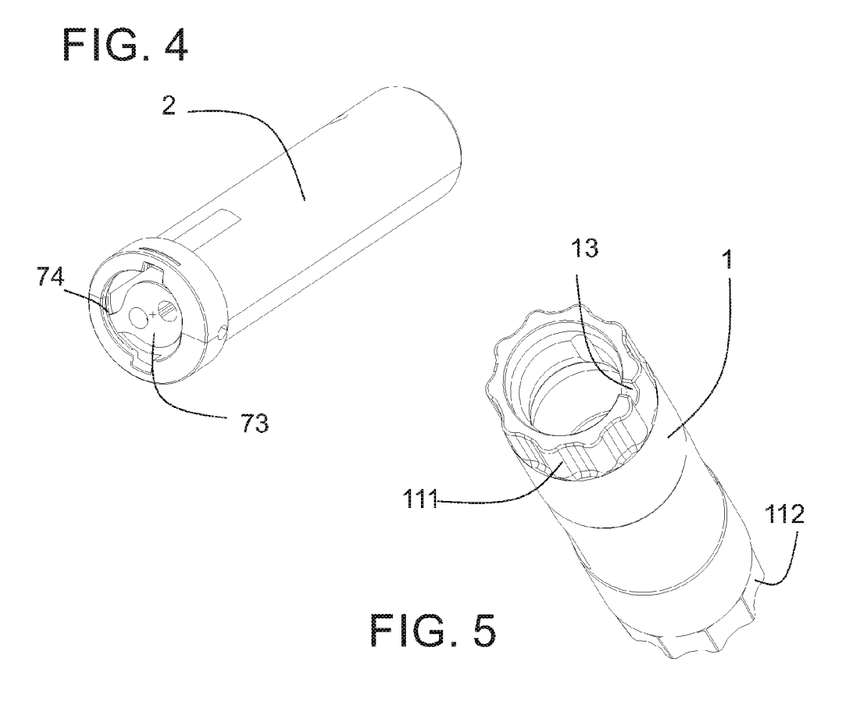
FIG. 4 shows a perspective view of a preferred embodiment of the support member (2).
FIG. 5 is a perspective view of the shaft (1) showing the groove shaft (13).

In a preferred embodiment, the support member (2) is cylindrically arranged in two elements detachably jointed by its longitudinal section by means of a first fixing member (21). Said support member (2) housed inside the shaft (1) is provided with a support projection section (2a) in contact with the corresponding support recess (113) made in the hollow shaft (1) in order to fix its position.

Said support member (2) houses the electronic control unit (3) configured in a preferred embodiment in a shaped plate supported and anchored by grooves and protrusions made in said support member (2).

In a preferred embodiment of the invention, the torque and power measuring device (9) is provided with a pair of strain sensors (10) located diametrically opposite on the shaft (1) outside surface, so that they add its signals giving an output voltage signal proportional to the torsional forces exerted by a non-drive side cyclist leg. Each strain sensor (10) comprises a pair of strain gauges (100) configured in +/−45° in relation to the shaft (1) generating line, in a Wheatstone bridge configuration. This strain sensor (10) arrangement in the shaft (1) enables to offset the temperature effects and the opposite efforts measurement cancelling them and therefore providing only an output signal proportional to the torque.

These strain sensors (10) transmit the detected data for example by wiring (8) to a processor module (301) located in the electronic control unit (3), so that after calculating and processing the data, this processor module transmits the information and data by known means, such as coaxial wiring (80), to the antenna (81) which wirelessly emits by radiofrequency said output signals to a receiving device (84), usually located within a computer placed on the handlebar cycle or elsewhere on the bicycle frame, which uses the received information to calculate several parameters related to the forces and/or power cyclist distribution, stores it in a file for later analysis, and also displays it on a real-time display.

Furthermore, the antenna (81) also receives signals from a computer as: initial load and firmware updates (i.e., executable processor commands or their changes), computing commands, changes in how to use the torque and power measuring device (9), (calibration mode, measure mode with or without magnet, etc.), introduction of initial data needed for calculation (crank arm length, rear wheel radius, . . . ).

Another object of the present invention is how to output the antenna (81) outside the shaft (1) to allow correct wireless signal transmission, inasmuch as due to the geometry of the shaft (1) with the crank arms (40, 41) (40', 41') assembly, the crank arms themselves or the spider shields or blocks the signal, so the transmission is not done correctly, or is done in a direction that is not the right one to be received by the aforementioned receiving device (84).

Figure 7:
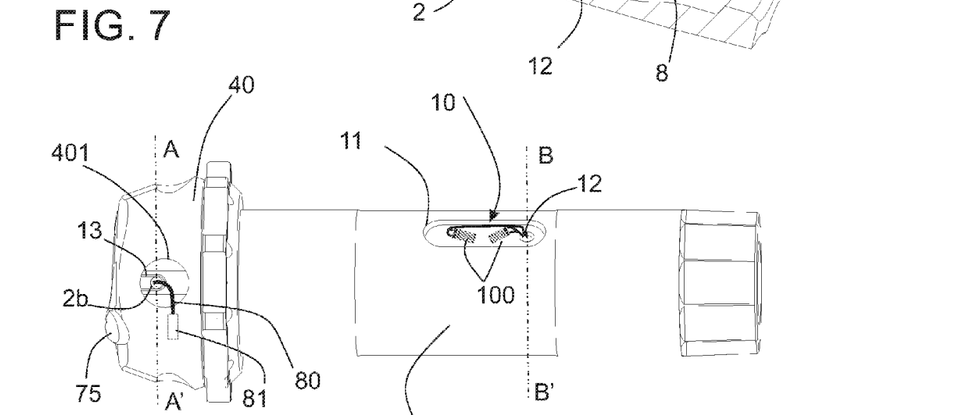
FIG. 7 is a view of the assembly between the shaft (1) and the jointed crank arm (40) in the longitudinal direction of said crank arm (40), showing the groove (13) made at the shaft (1) end and the opening (401) made in the jointed crank arm (40) to allow the output of the antenna (81) wiring (80) outwards. The recess (11) performed in the outer surface of shaft (1) wherein the strain sensor (10) is housed, is also shown.

Therefore, in the present invention the jointed crank arm (40, 40') is provided in its coupling end with the shaft (1) with an opening (401) to let the corresponding antenna (81) wiring (80) pass by.

Figure 8:
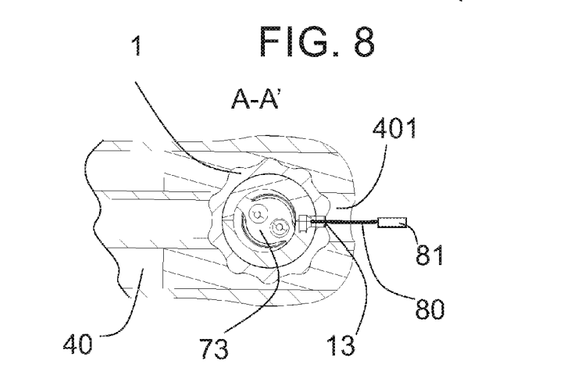
FIG. 8 is the section A-A' of the assembly area between the shaft (1) and the jointed crank arm (40) of FIG. 7, showing the groove (13) made in the shaft assembly section (111) for the output of the antenna (81) wiring (80).

In addition, the shaft (1) is provided with a groove (13) located in its assembly section (111) with the jointed crank arm (40, 40'), to let the antenna (81) wiring (80) pass by from inside the shaft (1) towards said opening (401) of the jointed crank arm (40, 40').

Moreover, the support member (2) is provided in its corresponding housing area of the closure member (75) with a radially oriented opening to let the antenna (81) wiring (80) pass by outside said support member (2).

In one embodiment of the torque and power measuring device (9), it further comprises a cover member (7), preferably detachable, fixed to the jointed crank arm (40, 40') area where the opening (401) is placed allowing the antenna (81) wiring (80) pass by to the outside; so that, it protects said antenna (81) from shocks and moisture, allowing however the output of the radiofrequency signal emitted to the outside, as it is made from a material transparent to said signal (plastic-like material).

The torque and power measuring device (9) further comprises a removable closure member (75) located in the end shaft (1) corresponding to the assembly with the jointed crank arm (40, 40') closing the power supply unit (5) and sealing against water the assembly that comprises the support member (2), the electronic control unit (3) and the power supply unit (5), fitting on a housing of said jointed crank arm (40, 40').

Figure 6:
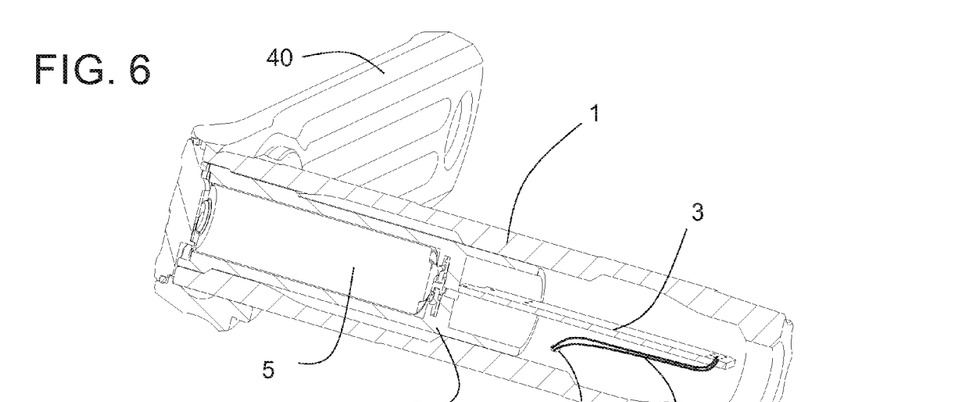
FIG. 6 is a longitudinally sectioned view of a torque and power sensor device (9) showing the support member (2) and the electronic control unit (3) housed on the shaft (1), and the power supply unit (5).

The aforementioned power supply unit (5), preferably a battery or a rechargeable battery, is detachably housed inside the support member (2) for easy replacement thereof. This power supply unit (5) is placed in the corresponding assembly crank end with the shaft (1) mounted on a support-ejector member (51) so that it automatically comes out from the shaft (1) when removing the closure member (75).

In order to measure different magnitudes of interest, the electronic control unit (3) has an angular position sensor (20) or rotation sensor of the shaft (1) which measures the crank arms (40, 41) angular position, and later determines its instantaneous angular velocity by derivation. Said angular position sensor (20) comprises at least one of the following elements, preferably by combining at least two of them:

An accelerometer (201) at least bi-axial, located on the axis (X) of the shaft (1), so it has two measurement axes orthogonal to said axis (X) to let us know various variables measuring the gravitational field change with respect to these axes.

A tri-axial magnetic sensor (202) that measures the angular position of the jointed crank arm (40, 40') at any time, in the presence of a stationary magnetic field in the bicycle frame.

A gyroscope (203) used to detect angular variations in the jointed crank arm position (40, 40') and therefore the angular velocity thereof, which provides redundancy and additional accuracy in measurement and calculation.

The above mentioned elements comprised in the angular position sensor (20), can be used to measure different magnitudes depending on the combination we make with them, so the accelerometer (201) can be used for measuring the angular position of the crank arm (40, 41) with time under zero bicycle speed conditions, for example in roller or in bench cycling test where the bicycle is standing but the bottom bracket is moving. To this end, a change is made from the reference system (X1, Y1, Z1) corresponding to the accelerometer (201) to the reference system corresponding to the cranks (X2, Y2, Z2), making a correlation between the accelerometer (201) angular position (which varies upon rotation of the shaft (1) in which it is housed), and the crank arm angular position at all times. Thus, it is known the crank arm (40, 41) angular position versus gravity at all times under these conditions. In one embodiment of the device, the X2 axis is coincident with the axis (X) of the shaft (1) in the drive side direction and Y2 is the direction corresponding to the non-drive side crank arm in its corresponding pedal direction.

In another embodiment, the accelerometer (201) is used to measure the time taken for the crank arm to make a complete revolution and therefore the rotation cadence of the jointed crank arm (40, 40'), and thus estimating the angular speed constant in each cycle being coincident with said cadence value. This requires: firstly, a coordinate change from the accelerometer (201) reference system (X1, Y1, Z1) to the cranks reference system (Y2, Z2), and later a pedaling cycle count by detecting the change of direction of said reference systems in each reference quadrant until the first quadrant is reached again. So it is counted a complete cycle every time the change of direction of said reference systems is repeated, giving rise to the following sequence corresponding to the direction change in the abovementioned cranks reference system (Y2, Z2) in a complete cycle: (+,+), (−,+), (−,−), (+,−), (+,+) restarting again the same sequence in each new pedaling cycle.

In the other hand, said tri-axial magnetic sensor (202) is used to measure the time-dependent angular position of the crank arms (40, 41) under any bicycle speed conditions, using said magnetic sensor (202) together with a magnet (82) fixed on any near position of the bicycle frame. In this way it is also known the instantaneous crank arm angular speed as well as the time taken for said crank arm (40, 41) to complete one revolution. To do this, we make a calibration with the bicycle in static but rotating the crank arms which consists in correlating the angular position data given by the accelerometer (201) with different values of the magnetic field generated by the magnet fixed on the bicycle frame, measured by said magnetic sensor (202) in each different crank angular positions.

In an alternative use, the magnetic sensor (202) is utilized together with a magnet (83) located on the rim of the bicycle rear wheel instead of in a stationary point of the frame, so that it measures the time taken for the wheel to make one complete revolution; and therefore let us know both the instantaneous bicycle speed as the cyclist gear ratio at all times, as a result of the ratio between the rear wheel revolutions and the crank arm revolutions (40, 40').

In alternative embodiments of the torque and power measuring device (9) of the invention, other electronic components can be connected to the electronic control unit (3), comprising but not limited to: devices for measuring the cadence (reed switches, Hall sensors), integrated circuits, microcontrollers, radiofrequency communication hardware, antennas, batteries, other energy sources, earth wires, electrical filters and connection to other printed circuit boards or PCB.

To provide uniformity to all elements located inside the shaft (1) and to protect them from vibration, the electronic control unit (3), the support member (2) and at least part of the wiring can be encapsulated in a polyurethane foam type material, or silicone, etc.

Moreover, regarding the measurement and calculation of the abovementioned required variables, it is known that for calculating and interpreting the cyclist power distribution at any time, we need to measure two variables: the applied torque and the crank arm angular position obtained by deriving the angular speed. Thus, we calculate:

$$P = M*w = F*(w*r) = F*v$$

P is power in watts
M is the applied torque (Newton/meter)
w is the angular velocity (rad/s)
F is the applied force on the pedal coupled to the crank arm (Newton)
r is the crank arm length, fixed and known datum
Total Power=Right leg Power+Left leg Power In the case of the preferred embodiment of the torque and power measuring device (9) of the invention, which measures the left crank arm torque corresponding to the non-drive bicycle side, as we previously mentioned it is used to obtain the Power:

$$P\ \text{Left} = M\ \text{Left}*w$$

It is estimated the Total Power: PT=PL*K, and when there is no biomechanical data on the particular distribution of the power exerted by each cyclist leg it is generally used K=2; but it can be set any value for this K coefficient, if the balance between both cyclist legs is known.

As described above, many existing power meters in the Prior Art estimate the angular velocity as a constant in each pedaling cycle leading to measurement errors because the real speed is variable depending on several parameters including the type of pedaling ground and the slope, external wind conditions and resistance, etc.

In order to solve this problem, one torque and power measuring device (9) embodiment measures the time-dependent speed, so it is obtained greater precision and accuracy in the power measurement by calculating it from the data provided by the aforementioned sensors. This device is particularly advantageous in extreme speed variation conditions such as the following:

A) In the event of ground with steep slopes and therefore very low bicycle speed or large speed change (sprint start), as the acceleration in both cases is higher under these conditions, so both the linear and angular speed have more variation and the error is increased in estimating constant speed in a cycle.

Figure 12:
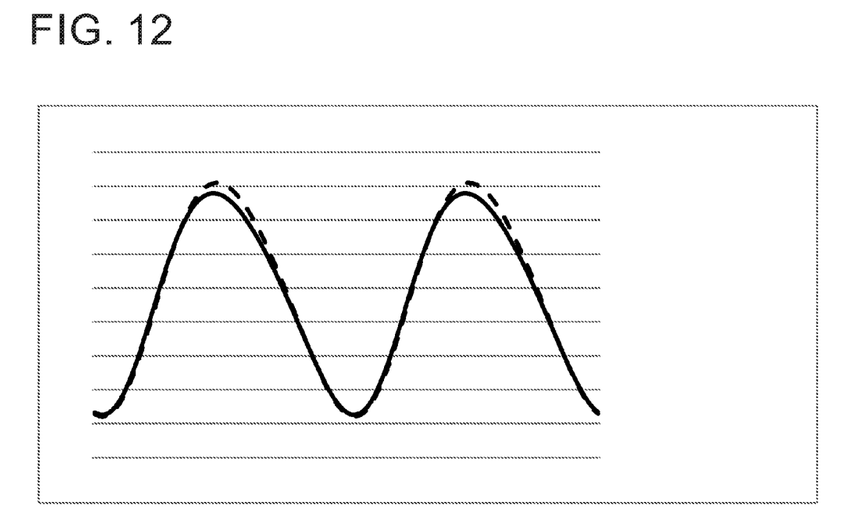
FIG. 12 is a graph showing the instantaneous power (vertical axis) versus time (abscissa) for oval chainrings with 10% ovality. The solid line represents the real power corresponding to the real instantaneous angular velocity, and the dashed line represents the estimated power when constant angular velocity (corresponding to the real cadence) in one revolution of the crank is assumed. The enclosed area between each curve and the horizontal axis corresponds to the average power carried out, and therefore the area enclosed between both curves the mistake made by that estimation.
Figure 13:
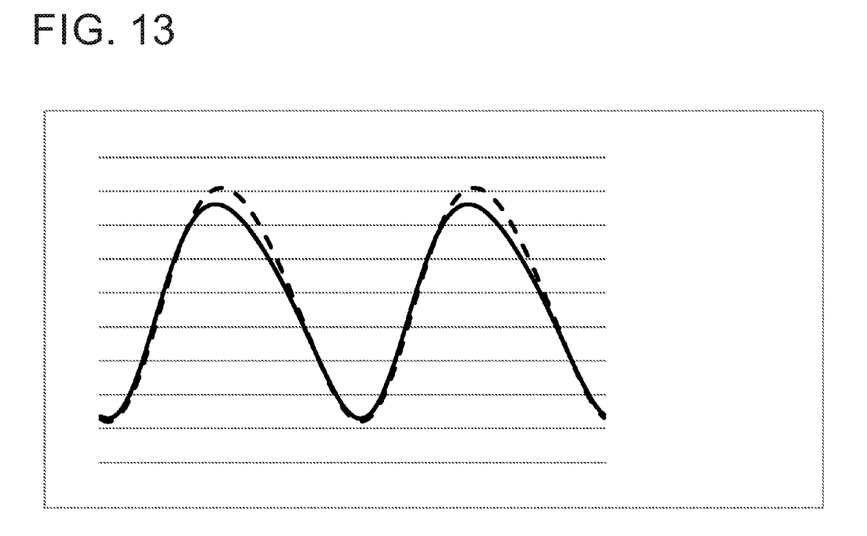
FIG. 13 is similar to the previous figure, but corresponding to oval chainrings with 16% ovality. It is showed that the deviation in the measurements is greater in this case.

B) In the event of using oval instead of circular chainrings, as due to the design thereof the angular speed is not constant at each revolution, ranging between 10%-20% depending on the ovality of the chainrings. This is shown in figures FIG. 12-13 representing the instantaneous power in relation to time in a complete pedaling cycle, and showing the error in considering a constant speed produces an overestimation of the power exerted by the rider; and depending on the degree of ovality, said error varies from +/−2% to +/−4%.

Figure 14:
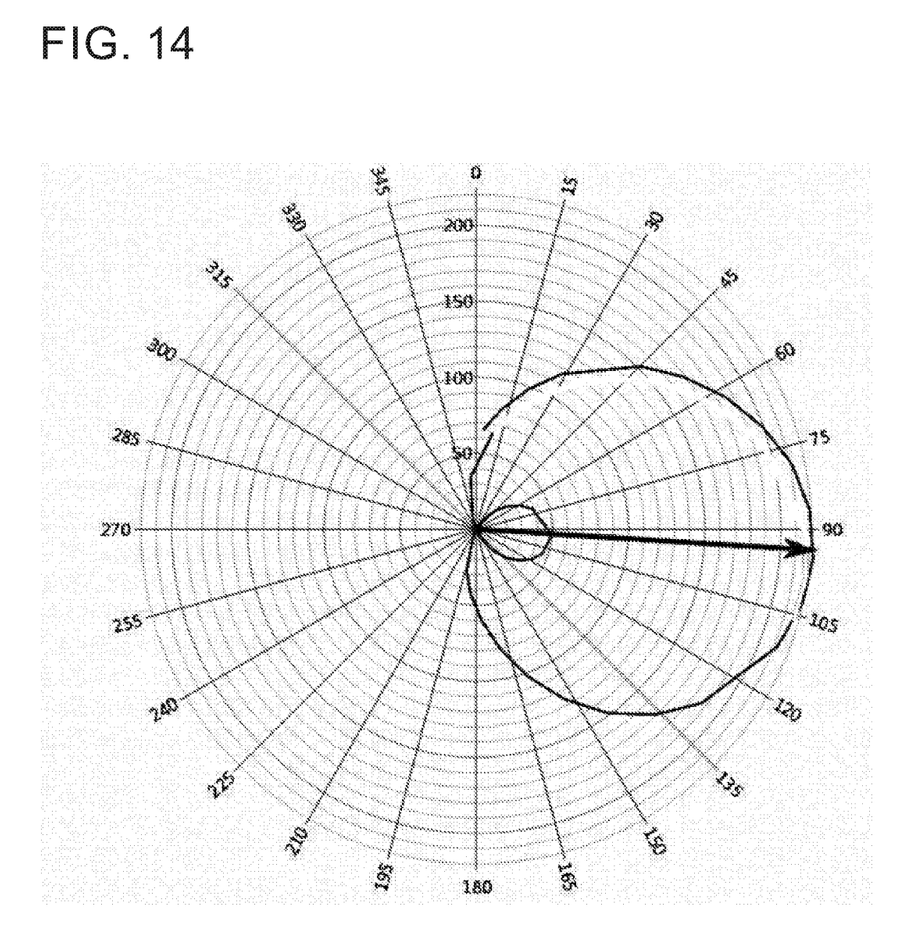
FIG. 14 is a polar graph showing the real applied force (newton) in a pedal, versus the shaft (1) rotation angle along a complete revolution (degree). It is also showed, a vector corresponding to the angular position of the centroid of the area enclosed by this graph, which corresponds to the work exerted by one cyclist leg in a complete cycle pedaling.

The torque and angle measurements taken at regular intervals are called samples, and the time interval between samples is called the sampling interval. During operation the measurements are taken at high frequency in order to relatively provide accurate measurements through 360 degrees of each pedal stroke, considering the range of 60 to 120 rpm the typical bicycle operation and 90 rpm the most typical value. In a preferred embodiment, the torque and power measuring device (9) of the invention emits data samples measured by the sensors at f=200 Hz frequency, so that the torque measurements are taken around each 3 degrees. This gives us a very high resolution measurements, allowing a graphical representation of the variables involved, such as the torque polar or the applied force view depending on the angle, as shown in FIG. 14.

In the calculation method of the invention, each complete pedaling cycle is discretized into a number of "j" sectors, so it is considered constant speed in each of said sectors to calculate power, thus increasing the measurement accuracy and minimizing the error, particularly in the event of oval chainrings. In each of said "j" sectors, the number of samples "nj" used for the calculation depends therefore on the time the crank arm takes to travel that sector.

Figure 11:
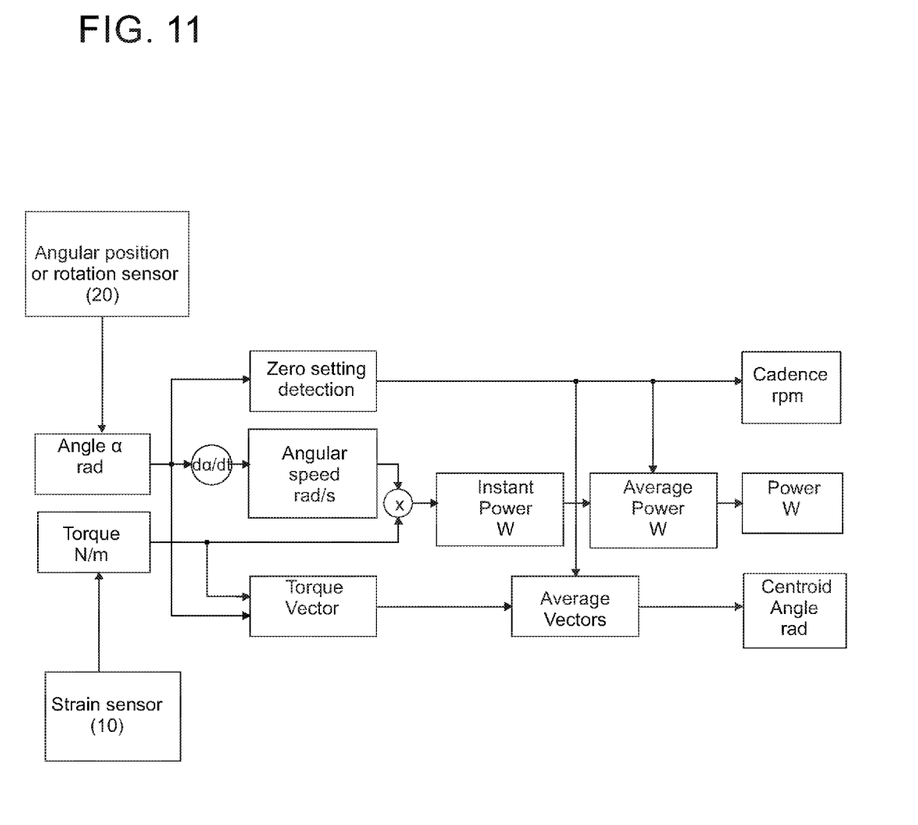
FIG. 11 shows a flow chart of a preferred measurement method and operation implemented in the torque and power sensor device (9).

FIG. 11 shows a flowchart of a calculating method of the torque and power measuring device (9) of the present invention with the following steps:

In step 1, the cyclist starts pedaling and said device goes from sleep mode to operational mode.

In step 2, the measurements from the strain sensors (10) placed on the shaft (1) and from the angular position sensor (20) (accelerometer, magnetic, gyroscope . . . ) are simultaneously detected.

In step 3, the electronic control unit (3) converts the deformation values into torque values.

In step 4 the electronic control unit (3) calculates the required parameters of the shaft (1) jointed crank arm (40): the start or zero crossing detection in each crank arm cycle, the crank arm angular speed, and the torque vector, which represents the module and angular position of the jointed crank arm (40) for each instantaneous torque value.

In step 5, the instantaneous power data is obtained by multiplication the instantaneous torque and the angular speed data.

In step 6, the instantaneous data corresponding to the different embodiments of the device are averaged to obtain the following output:

The last pedaling cycle power, i.e., the ratio between the work done in each pedal stroke and the time taken to travel said cycle;

The pedaling cadence;

The working centroid angle or angular position of the vector torque weighted average, which gives us valuable information about the biomechanics of cycling and for optimizing the use of oval chainrings. Therefore, it is known the angular orientation of the work done by one cyclist leg in a complete pedalling cycle. If we represent in polar coordinates the torque or the effective force applied to a pedal versus the rotation angle of the shaft (1) along a complete cycle, the area enclosed by the graph represents the total work in that cycle, and the value we want to know is the angular position of the centroid of said area.

And finally in step 7, the electronic control unit (3) wirelessly transmits this output by the antenna (81) to a CPU so that the cyclist can view, store and analyse said data.

Other Embodiments

Figure 1:
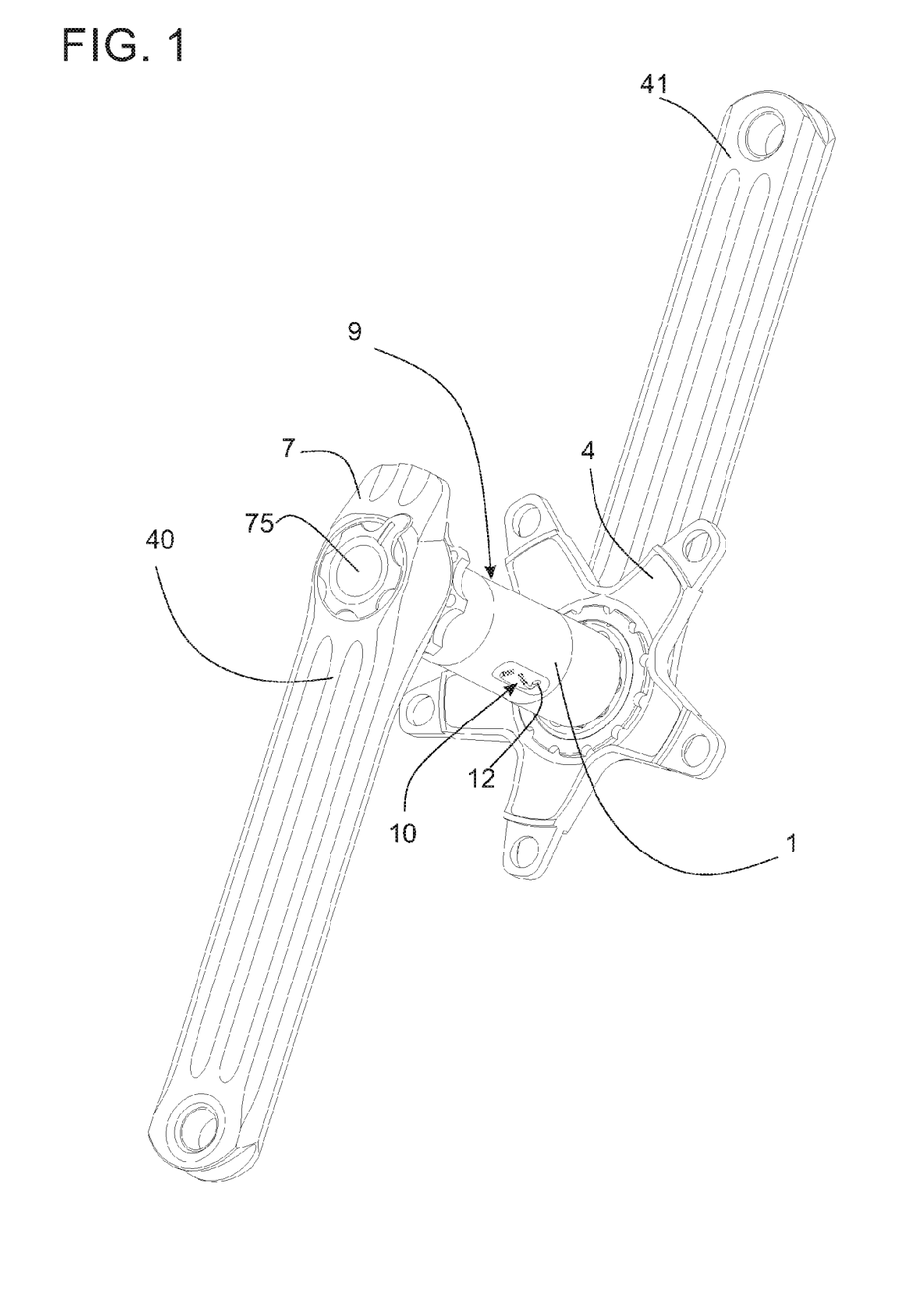
FIG. 1 shows a perspective view of a torque and power sensor device (9) according to the invention mounted on the assembly comprising the hollow shaft (1) that connects the bicycle cranks; the jointed crank arm (40) to the shaft (1), in this case the left one; the detachable crank arm (41), in this case the right one, and a conventional spider (4).
Figure 2:
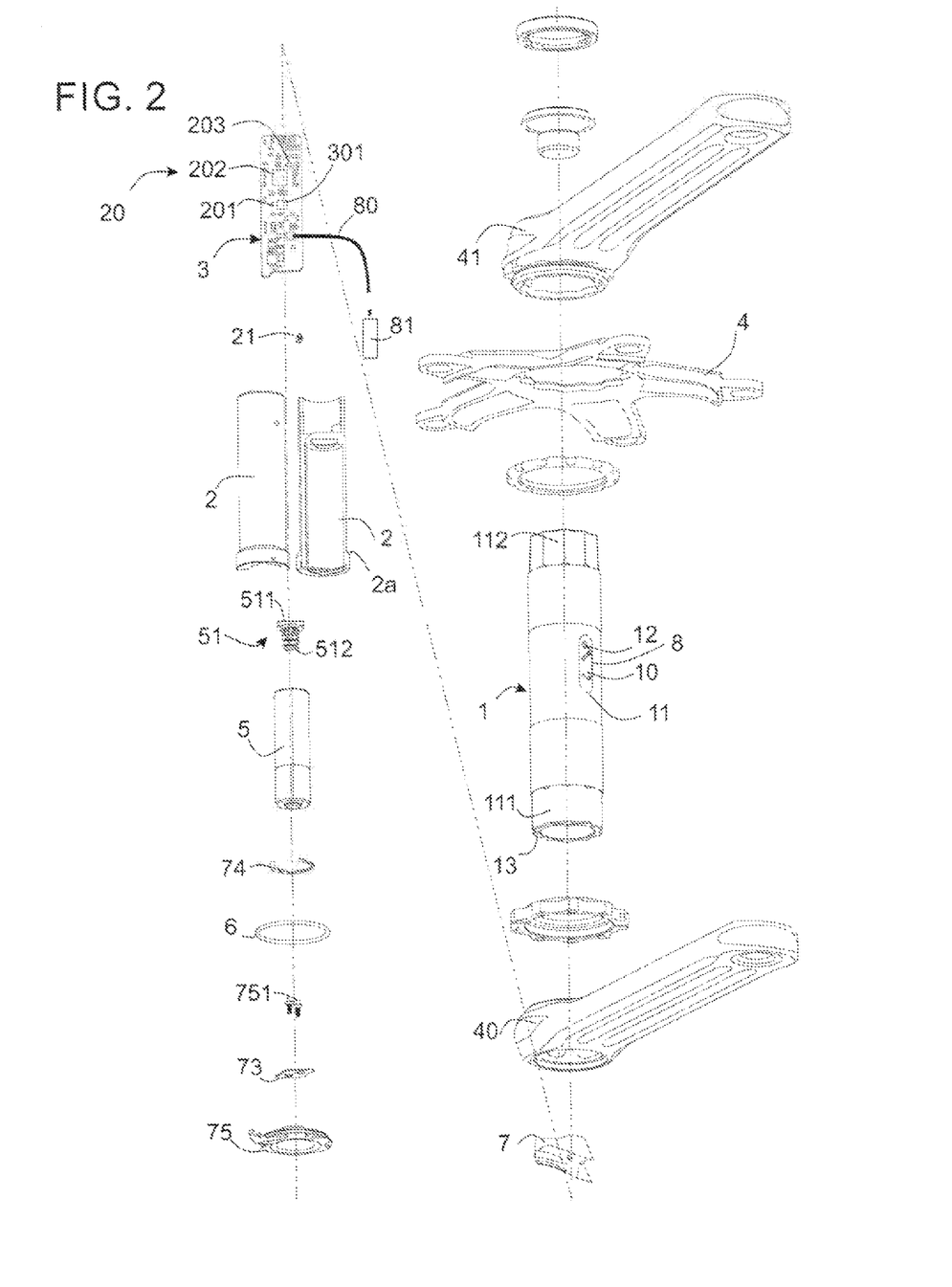
FIG. 2 shows an exploded view of the sensor device (9) components' of FIG. 1.
Figure 3:
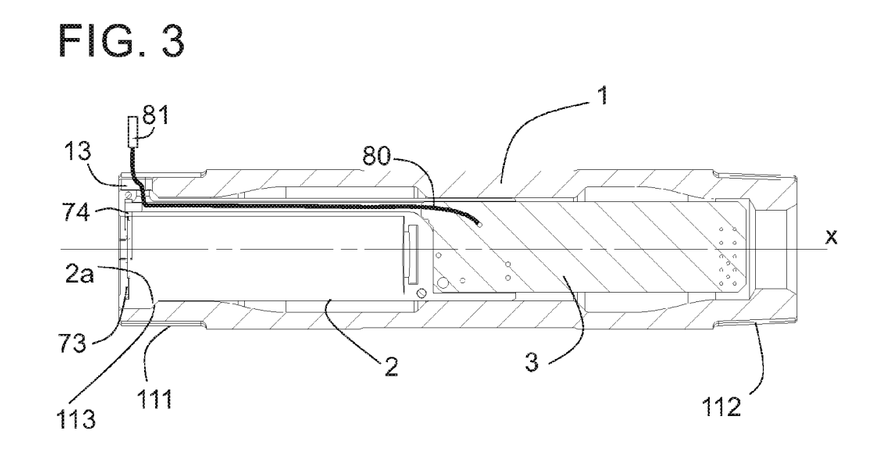
FIG. 3 is a longitudinal section in the shaft (1) direction, showing the support member (2) housed therein, the electronic control unit (3) and the first (73) and second (74) electrical contact members of the power supply unit (5); as well as the groove (13) located in the assembly section (111) between the shaft (1) and the crank arm (40) jointed to the shaft (1), for the output of the electric wiring (80) of the antenna (81) outwards.

The torque and power measuring device (9) described above measures only the exerted torque by the cyclist only with the left leg corresponding to the non-drive bicycle side, and usually multiplies this measure by two in order to estimate the power applied by the two legs, considering therefore equal. This estimated value is enough for most user's power calculations. In this preferred embodiment, the shaft (1) is assembled with a jointed crank arm (40) corresponding to the left or non-drive bicycle side.

Figure 10:
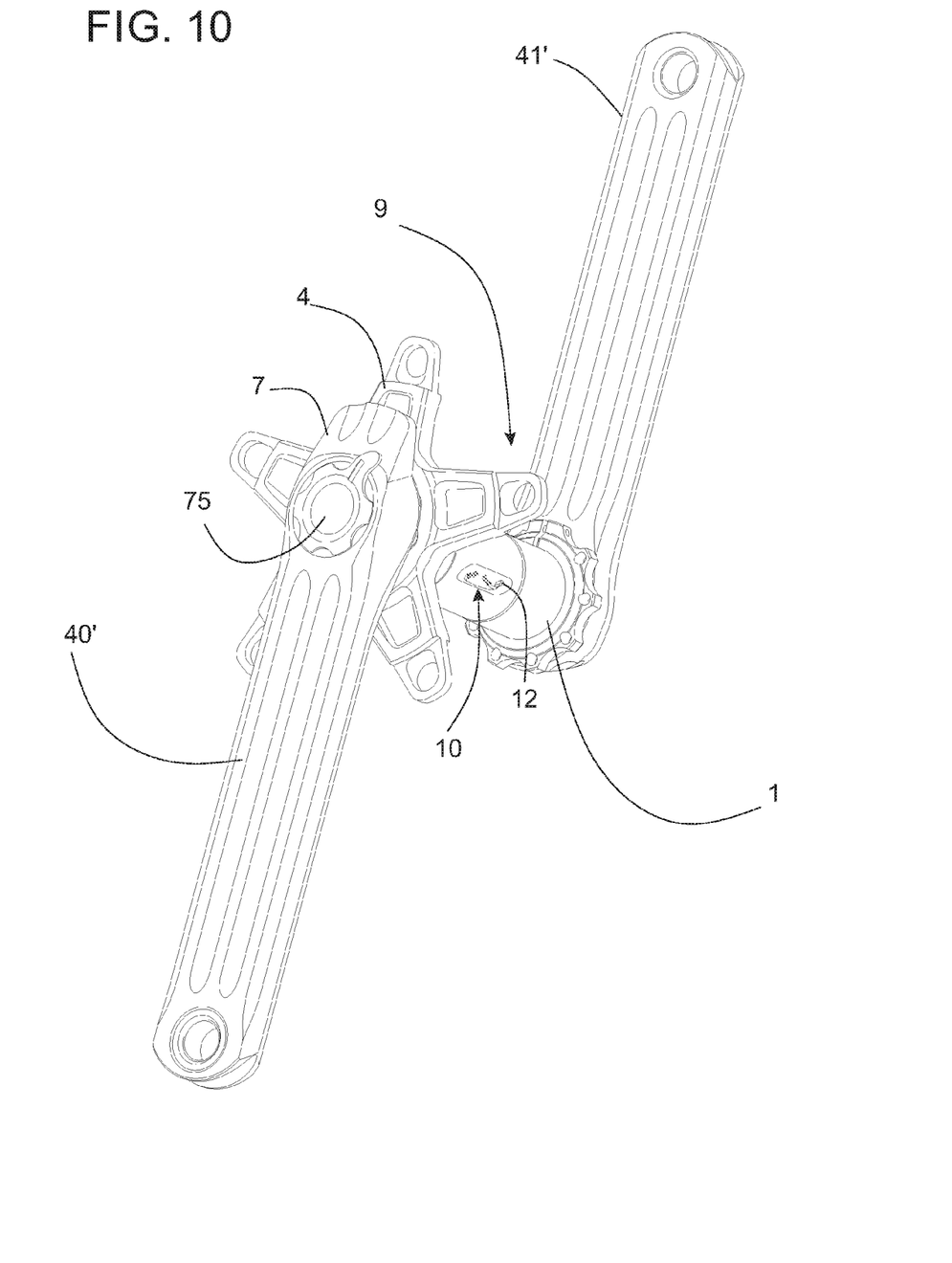
FIG. 10 shows a perspective of a torque and power sensor device (9) according to an alternative embodiment of the invention, mounted on the assembly comprising a hollow shaft (1) that connects the bicycle cranks; a jointed crank arm (40) to the shaft (1), in this case the right or drive side one, a conventional spider (4) for engaging chainrings; and a detachable crank (41'), in this case the left or non-drive side one.

For situations where we need to measure the power applied by both legs, we can arrange the aforementioned torque and power measuring device (9) in an alternative embodiment by assembling the shaft (1) with a jointed crank arm (40'), but in this case the corresponding to the drive bicycle side (right side). In this alternative embodiment, said jointed crank arm (40') comprises at least one strain sensor (10') placed in said jointed crank arm (40') to measure the deformation due to the bending moment of said crank arm (40') in the plane of pedaling, being connected to the above mentioned same electronic control unit (3), so it is also independently measured the torque and power exerted by the cyclist with his drive side leg (right). Furthermore, said electronic control unit (3) housed in the shaft (1), comprises a receiver module (301') of the signal produced by the strain sensors (10') located in said jointed crank arm (40').

Another alternative embodiment for the aforementioned torque and power measuring device (9) is assembling the shaft (1) with a jointed crank arm (40') corresponding to the drive bicycle side (right side) attached to a corresponding spider (4). In this embodiment, said spider (4) is provided with strain sensors (10") placed in it and connected to the electronic control unit (3), so it measures the torque and power exerted by the cyclist with both legs at the same time, obtaining data for the right leg as the difference between total measured data in the spider (4) and left leg data measured by the sensors located on the shaft (1).

The invention claimed is:

1. A torque and power measuring device located on a non-drive side cyclist leg, comprising:

a hollow shaft configured in one piece, which connects a first bicycle crank arm and a second bicycle crank arm, wherein the first crank arm is a jointed crank arm relative to a shaft, and the second crank arm is a detachable crank arm;

at least one strain sensor disposed on a surface of said shaft which measures deformation caused by torque on the shaft;

at least one angular position sensor or rotation sensor of the shaft;

a support member housed inside the shaft and moving jointly with it, which supports an electronic control unit configured to receive input signals at least from the abovementioned strain and positioning sensors, to store data, to perform pre-programmed calculation operations with them and to output result signals;

a power supply unit housed inside a support member;

a radiofrequency antenna, located outside the shaft anchored to an outer surface of the jointed crank arm in its corresponding assembly area with the shaft, and wiring connected to the electronic control unit which wirelessly sends the result signals to a signal receiving device;

characterized in that the jointed crank arm is provided with an opening located in the assembly crank end with the shaft, through which antenna wiring passes to outside the shaft.

2. A torque and power measuring device according to claim 1, characterized in that the shaft is provided with a groove located at its assembly section with the jointed crank arm, to let the antenna wiring pass by from inside the shaft towards said opening of the jointed crank arm.

3. A torque and power measuring device according to claim 2, characterized in that said strain sensor is arranged on an outer surface of the shaft which comprises at least one opening to let the strain sensor wiring pass by to connect it with the electronic control unit.

4. A torque and power measuring device according to claim 3, characterized in that said strain sensor comprises a pair of strain gauges arranged in +/−45° in relation to the shaft generating line, in a Wheatstone bridge configuration.

5. A torque and power measuring device according to claim 4, characterized in comprising at least one pair of strain sensors diametrically opposite located.

6. A torque and power measuring device according to claim 3, characterized in that the shaft is provided with at least one recess made on its outer surface wherein at least one strain sensor is housed.

7. A torque and power measuring device according to claim 6, characterized by further comprising a removable closure member located in the end shaft corresponding to the jointed crank arm to seal a power supply unit.

8. A torque and power measuring device according to claim 7, characterized in that said angular position sensor comprises an accelerometer at least bi-axial, located on the axis of the shaft and a magnetic sensor at least bi-axial, so that the angular position of the jointed crank arm is known at all times.

9. A torque and power measuring device according to claim 8, characterized in that said accelerometer is used to measure the angular position of the crank arm with time, under zero bicycle speed conditions.

10. A torque and power measuring device according to claim 8, characterized in that said magnetic sensor is used to measure a time-dependent angular position of the crank arms under any bicycle speed conditions, using a magnet fixed on any near position of a bicycle frame.

11. A torque and power measuring device according to claim 8, characterized in that said magnetic sensor together with a magnet located on a rim of a bicycle rear wheel, is used to measure the time taken for the wheel to make one complete revolution, to compute both instantaneous bicycle speed and cyclist gear ratio at all times, as a result of a ratio between the rear wheel revolutions and the crank arm revolutions.

12. A torque and power measuring device according to claim 7, characterized in that said angular position sensor comprises an accelerometer at least bi-axial, located on the axis of the shaft and a gyroscope so that the angular position of the jointed crank arm is known at all times.

13. A torque and power measuring device according to claim 12, characterized in that said accelerometer is used to measure a time period in which the crank arm makes a complete revolution and therefore a rotation cadence of the jointed crank arm.

14. A torque and power measuring device according to claim 7, characterized in that said angular position sensor comprises a magnetic sensor and a gyroscope to know at any time the angular position and velocity of the jointed crank arm.

15. A torque and power measuring device according to claim 1, wherein the jointed crank arm is located on a bicycle drive-side, and further comprising at least one strain sensor which measures a deformation caused by a bending moment of said jointed crank arm in a plane of pedaling, and being also connected to the electronic control unit in order to independently measure as well torque and power exerted by the drive side cyclist leg.

* * * * *